Patented June 24, 1924.

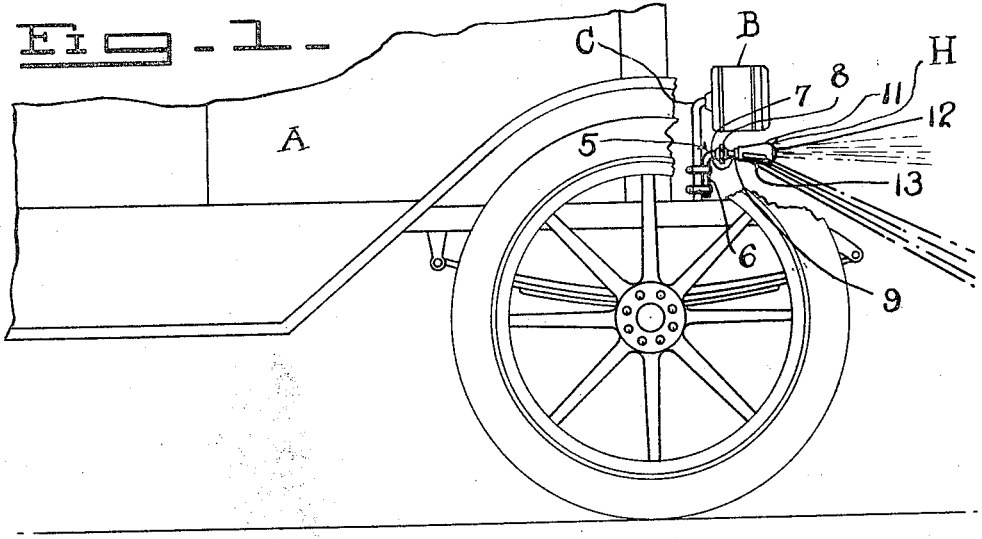
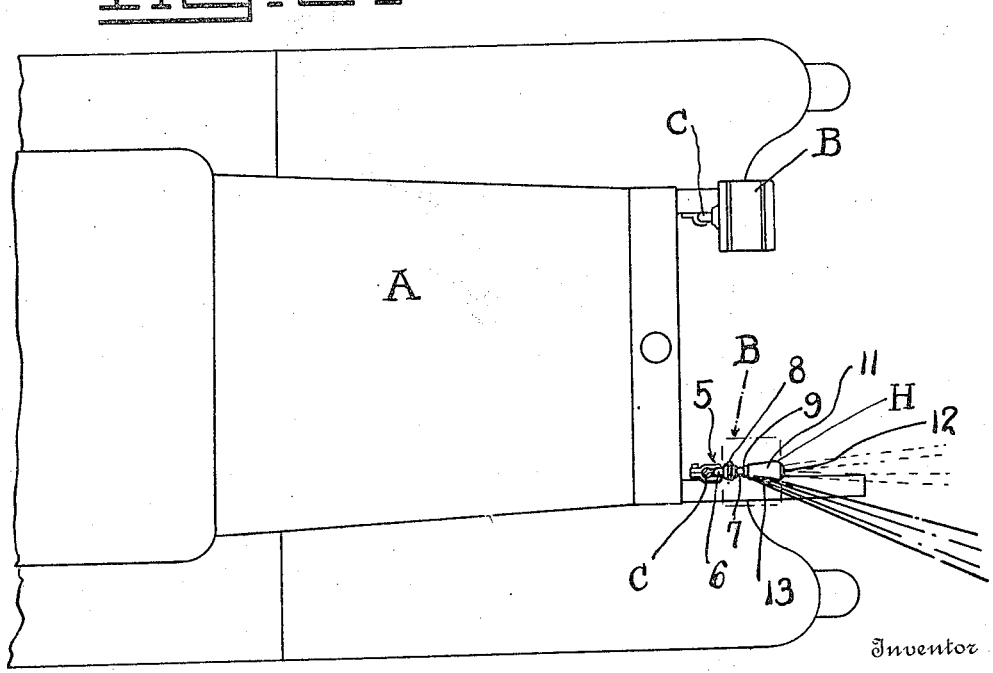

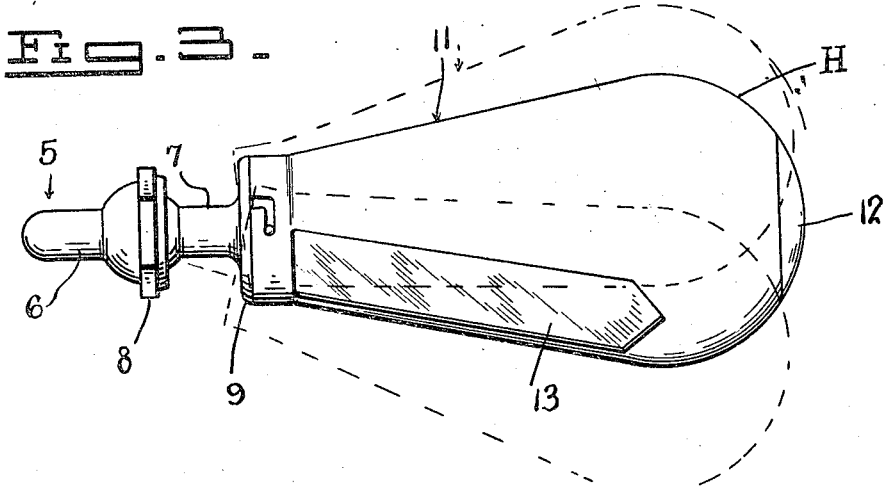
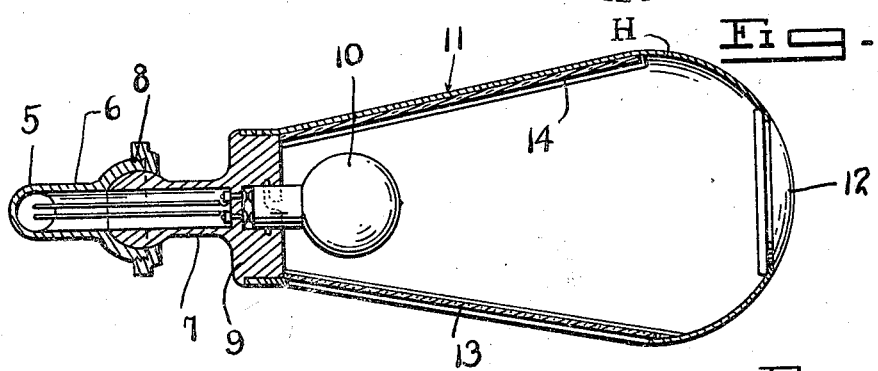
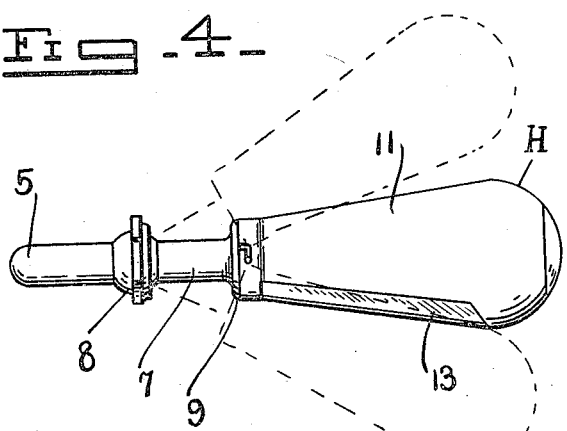
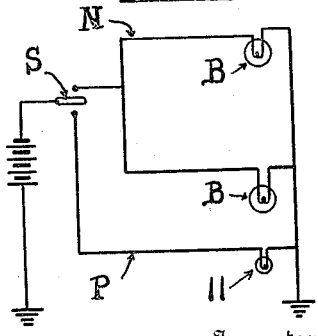

1,498,883

UNITED STATES PATENT OFFICE.

EDWARD E. NEWBY, OF SHERIDAN, INDIANA.

DRIVING LIGHT.

Application filed April 26, 1923. Serial No. 634,720.

*To all whom it may concern:*

Be it known that I, EDWARD E. NEWBY, a citizen of the United States, residing at Sheridan, in the county of Hamilton and State of Indiana, have invented new and useful Improvements in Driving Lights, of which the following is a specification.

This invention relates to automobile equipment and more particularly to a driving light.

The primary object of this invention resides in the provision of a driving light, which is adapted to be used in conjunction with the ordinary headlights of an automobile to illuminate the side of the road in advance of the automobile upon which it is attached.

Another object of this invention resides in the provision of a driving light for automobiles which not only illuminates the side of the road in advance of the automobile upon which it is attached, but is so constructed that the rays of light therefrom will not annoy approaching traffic.

In conjunction with the aforesaid objects, this invention resides in the provision of a driving light, for automobiles, consisting of an association of lenses so arranged that the side of the road in advance of the automobile will be illuminated to enable the chauffeur of an automobile equipped with this particular light to drive close to the edge of the road and display a dim headlight to give the approaching traffic the position of his automobile.

A still further object of this invention resides in the provision of a driving light, for automobiles, which is adapted to be connected in circuit with the usual headlights to permit them to be alternately displayed at the will of the chauffeur.

Aside from the preceding objects, this invention resides in the provision of a driving light adapted to be adjusted in any desired position.

With these and other objects in view, this invention resides in certain novel features of construction, arrangement and combination of elements to be hereinafter more fully set forth in the specification, illustrated in the accompanying drawings and pointed out in the appending claim.

In the accompanying drawings:

Fig. 1 is a side view of a portion of an automobile with the elements of this invention arranged thereon.

Fig. 2 is a plan view thereof.

Fig. 3 is an enlarged side view of the driving light per se.

Fig. 4 is a plan view thereof.

Fig. 5 is a sectional view through the same.

Fig. 6 is a diagrammatic view of the wiring system of the ordinary headlights in circuit with the wiring system connecting a driving light constructed in accordance with this invention.

In the present illustration of this invention, the letter A designates a portion of an automobile having the usual headlights B supported by the usual or any suitable brackets C.

Suitably secured or otherwise rigidly supported by the brackets C, preferably adjacent the usual headlights, is a bracket 5 consisting of a stem 6 and arm 7 between which is disposed a ball and socket joint 8 of any suitable form which will permit the angularity of the stem 6 and arm 7 to be adjusted in any position and rigidly maintained at the desired angle.

Carried by the outer end of the arm 7 is a bulb socket 9 which removably carries a bulb 10 of the desired candle power and hood 11 particularly constructed to carry out the paramount functions of this invention.

The aforesaid hood 11 is provided with suitable fastening means for removably securing it to the bulb socket 9 and carries a lens 12 in the form of a bull's eye at its forward end and has an elongated lens 13 in the form of a removable window disposed on one side thereof. This lens or window is so disposed to the rear of the bull's eye lens that rays of light emitted therethrough are projected diagonally forward and behind the head portion H of the hood. With a lens arranged as aforesaid, traffic approaching directly in front of the bull's eye lens will be protected from the glare projected by the deflector 14 within the hood, thus permitting unobstructed observation of the light emitted through the bull's eye lens.

While the present disclosure involves the adoption of but one of the driving lights, namely the right-hand light, a similar light may be placed on the left-hand side of the automobile to further insure safety in driving at night.

In order to alternately control the ordinary headlights and the light comprising this invention, a two way switch S is disposed between the circuits N and P and with this system in operation, the headlights are shut off when the driving light is lighted or a system may be adopted whereby the driving light will remain lighted during the period of darkness and the headlights operated in the usual manner.

With this invention fully set forth, it is manifest that a driving light of great convenience to a chauffeur is produced and, since it is constructed to eliminate glare to approaching traffic, its adoption will eliminate headon collisions.

Having thus described this invention what I claim and desire to protect by Letters Patent is:

A driving light of the character set forth comprising a hood having its sides converging toward its inner end, a bull's eye lens in the front of the hood, a window to one side of the hood, fastening means on the inner end of the hood, a deflector in the hood, a bulb socket supporting the head, a swiveled bracket supporting the bulb socket and locking means for the swivel socket.

In testimony whereof I affix my signature.

EDWARD E. NEWBY.